United States Patent [19]

Rieben et al.

[11] Patent Number: 4,679,377

[45] Date of Patent: Jul. 14, 1987

[54] APPARATUS FOR APPLYING AN END PLUG TO AN END OF A FUEL ROD TUBE

[75] Inventors: Stuart L. Rieben; Mark E. Wylie, both of Mt. Lebanon Twp., Allegheny County, Pa.

[73] Assignee: Westinghouse Electric Corp., Pittsburgh, Pa.

[21] Appl. No.: 873,642

[22] Filed: Jun. 12, 1986

Related U.S. Application Data

[62] Division of Ser. No. 678,519, Dec. 5, 1984.

[51] Int. Cl.⁴ .............................................. G21C 3/10
[52] U.S. Cl. ...................................... 53/327; 376/261; 29/235; 29/723
[58] Field of Search ............... 376/261, 451, 409, 260, 376/463; 29/234, 271, 272, 282, 237, 400 N, 723, 235; 53/319, 342, 345, 357, 327; 221/267, 307; 277/116.2, 117, 121; 285/24, 27; 141/392; 414/146

[56] References Cited

U.S. PATENT DOCUMENTS

| | | | |
|---|---|---|---|
| 1,659,049 | 2/1928 | Rulison | 53/327 |
| 3,151,426 | 10/1964 | Pechmann | 53/357 |
| 3,327,454 | 6/1967 | Franz | 53/357 |
| 3,725,635 | 4/1973 | Fink et al. | 376/451 |
| 4,113,143 | 9/1978 | Spagnola, Jr. | 221/267 |
| 4,223,436 | 9/1980 | Silva | 29/234 |
| 4,296,546 | 10/1981 | Hill et al. | 29/234 |
| 4,448,424 | 5/1984 | Ernst | 277/121 |
| 4,566,835 | 1/1986 | Raymond et al. | 376/261 |
| 4,586,250 | 5/1986 | Cooper, Jr. et al. | 29/723 |

FOREIGN PATENT DOCUMENTS

| | | | |
|---|---|---|---|
| 0051994 | 5/1982 | European Pat. Off. | 221/267 |
| 2286474 | 5/1976 | France | 376/451 |

Primary Examiner—Deborah L. Kyle
Assistant Examiner—Dan Wasil

[57] ABSTRACT

An improved apparatus for applying an end plug to an end of a fuel rod tube includes a housing having spaced inlet and outlet ends adapted to receive the end plug and tube end, respectively, one of three alternative embodiments of a guide arrangement which defines an internal guide channel aligned in tandem with the inlet and outlet ends of the housing along a common axis, and cylindrical ram movable along the axis for engaging and moving the end plug from the inlet end through the guide channel to the outlet end where the plug is applied to the tube end. The guide arrangement, whether is takes the form of a deformable bushing, a series of radially-mounted inwardly-biased runners or a series of parallel-mounted inwardly-biased rolls, defines the guide channel with a cross-sectional size smaller than that of the end plug and when contacted by the moving plug yieldably expands such that the guide channel conforms to the external surface of the end plug and thereby establishes and maintains guiding contact therewith as the end plug is moved through the guide channel.

5 Claims, 8 Drawing Figures

APPARATUS FOR APPLYING AN END PLUG TO AN END OF A FUEL ROD TUBE

This is a divisional of co-pending application Ser. No. 06/678,519 filed on 12-05-84.

BACKGROUND OF THE INVENTION

1. Field of the Invention

The present invention relates generally to the manufacture of nuclear fuel rods to be incorporated into fuel assemblies for nuclear reactors and, more particularly, is concerned with an improved apparatus for applying an end plug to a fuel rod tube end such that the end plug is guided in a secured manner into the tube end regardless of where the end plug falls in its diametral tolerance range.

2. Description of the Prior Art

Fuel elements or rods for nuclear reactors commonly encase the fissible material in thin walled cladding or tubes which serve to support the nuclear fuel during the operation of the reactor. The nuclear fuel, which is usually in the form of cylindrical pellets of enriched uranium dioxide, must be isolated from the environment surrounding the tubes to prevent contact and chemical reactions between the fuel and other materials such as water in a pressurized water reactor. Thus, the nuclear fuel is ordinarily hermetically sealed in each thin walled tube by the use of a pair of opposite end closures or plugs.

It is critical that the end plugs themselves be impermeable and mechanically strong to contain the fissible products. It is equally critical that the mechanical connection of each end plug with an end of each tube be free of defects such as discontinuities, cracks and tube distortions which could eventually produce leaks.

Present methods of applying the end plugs use close fitting guides to align the plugs with the tube, such as illustrated in FIG. 2. Due to manufacturing tolerances, the necessary clearance between the plug and guide sometimes permits the plug to cock, or tip, as shown in solid line form in FIG. 2, which causes a shaving action on the plug exterior as the plug is rammed home. Thereafter, when the connection is completed such as by welding the plug to the tube, faulty welds commonly result which produce leaking because of discontinuities in the weld joint or connection caused by this shaving action. Also, frequently the plug does not seat properly which increases the likelihood of leakage. Additionally, pieces of the plug are broken off occasionally as it is forced into the tube. The broken pieces not only damage the end plug but also cause foreign objects to be deposited in the fuel rod.

Consequently, a need exists for an improved technique for applying an end plug to the tubular end of a fuel rod which will accommodate slight variations in the dimensions of interfitting parts due to unavoidable manufacturing of fuel rods to leakage and failure.

SUMMARY OF THE INVENTION

The present invention provides several embodiments of an improved apparatus for applying an end plug to the end of a fuel rod tube in a manner designed to satisfy the aforementioned needs. In each embodiment, intimate contact is maintained with the end plug by a conformable plug guide means which results in the end plug being securely guided until it enters the hollow tube end. The maintenance of continuous contact between the guide means and the end plug prevents the end plug from being propelled forward out of contact with a ram member being used to move the end plug through the guide means and into the tube end. As a result, the end plug is prevented from cocking, tipping or tumbling within the guide means so that it would not meet the tube end squarely.

Accordingly, the present invention sets forth an improved apparatus for applying an end plug to a hollow tube end of a nuclear fuel rod such that a close frictional interfitting engagement will be established between the end plug and the tube end facilitating the formation of a connection therebetween which hermetically seals the fuel rod, the improved apparatus comprising: (a) a housing having spaced inlet and outlet ends, the inlet end adapted to receive the end plug and the outlet end adapted to receive the tube end to which the plug is to be applied; (b) guide means disposed in the housing and having internal surface portions which define an internal guide channel aligned in tandem with the inlet and outlet ends of the housing along a common axis and being of a cross-sectional size smaller than that of an outer external surface of the end plug, the guide means being yieldably expandable radially with respect to the common axis; and (c) means disposed adjacent the inlet end of the housing and movable along the common axis for engaging and moving the end plug from the inlet end through the guide channel to the outlet end, the movement of the plug through the guide channel causing yieldable expansion of the crosssectional size of the guide means such that the surface portions of the guide means conform to the external surface of the end plug and maintain guiding contact therewith as the end plug is moved through the guide channel.

In a first alternative embodiment of the apparatus, the guide means is a bushing disposed in the housing which is composed of resiliently deformable material adapted to expand and conform to the outer external surface of the end plug upon contact therewith and thereby establish and maintain guiding contact with the end plug as it is moved through a central bore of the bushing which defines the guide channel.

In a second alternative embodiment of the apparatus, a plurality of elongated runners are mounted for radial movement along a series of passageways which are defined in the housing in spaced relationship to one another and extending generally parallel to and radially from the common axis. A plurality of resiliently expandable members circumscribing the housing and the runners bias them inwardly toward one another. However, the members are yieldable to allow movement of the runners away from one another upon contact with the outer external surface of the end plug for establishing and maintaining guiding contact with the end plug as it is moved through the guide channel defined by inner end surfaces of the runners.

In a third alternative embodiment of the apparatus, a plurality of elongated generally cylindrical rolls are mounted for movement radially in a series of recesses which are defined in the housing in spaced relationship to one another about the common axis and aligned generally parallel to one another and with the common axis. A plurality of resiliently expandable elements encircling the housing within respective circumferential slots therein which intersect with the elongated recesses and stretched about the rolls bias them toward inner ends of the recesses. However, the elements are yieldable to allow the rolls to move away from the inner ends of the recesses upon contact with the outer external surface of the end plug for establishing and maintaining guiding contact with the end plug as it is moved through the guide channel defined by inner facing surface portions of the rolls.

These and other advantages and attainments of the present invention will become apparent to those skilled in the art upon a reading of the following detailed description when taken in conjunction with the drawings wherein there is shown and dscribed an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
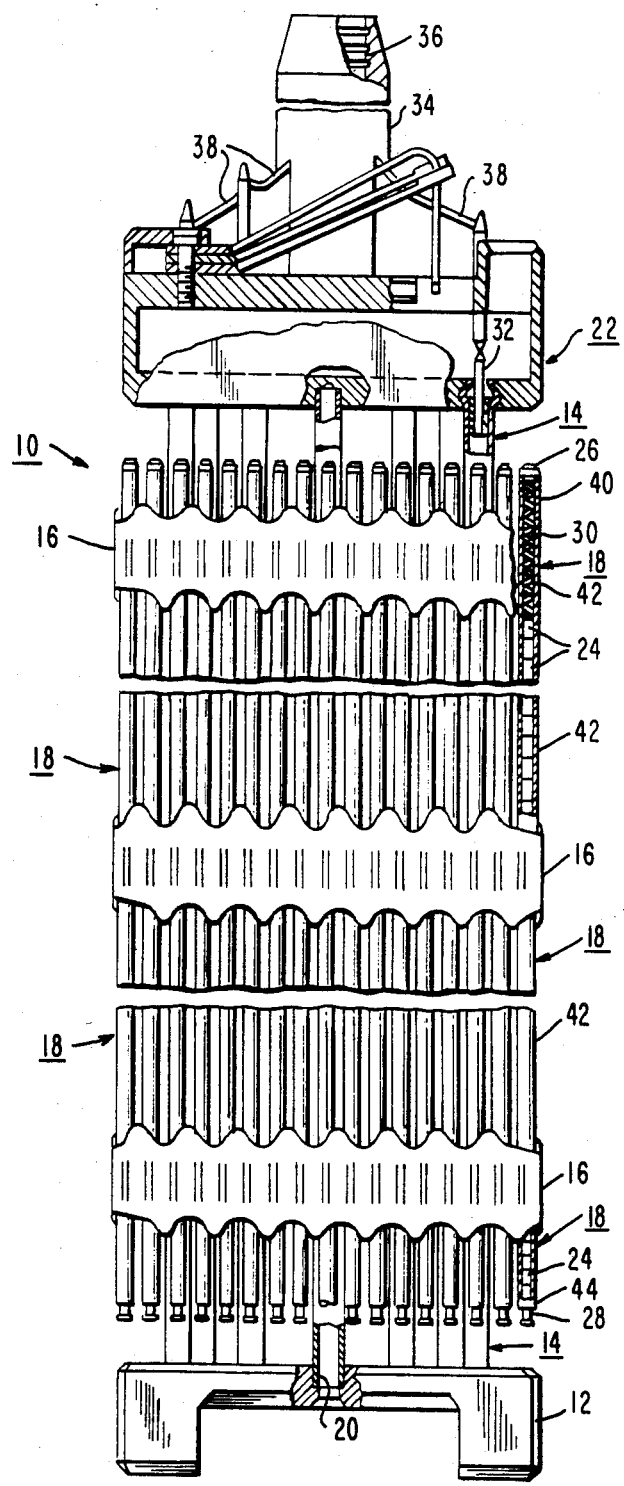
FIG. 1 is an elevational view, partly in section, of a fuel assembly having nuclear fuel rods whose end plugs were applied in accordance with the present invention, the assembly being illustrated in vertically foreshortened form with parts broken away for clarity.

In the following description, like reference characters designate like or corresponding parts throughout the several views. Also in the following desription, it is to be understood that such terms as "forward", "rearward", "left", "right", "upwardly", "downwardly", and the like, are words of convenience and are not to be construed as limiting terms.

In General

Referring to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conveniently handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24, and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissible material are responsible for creating the reactive power of the PWR. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally threaded cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Hereinafter, the structure and operation of the prior art apparatus and the improved apparatus for applying the upper and lower end plugs 26,28 to the opposite ends of each fuel rod 18 will be described in relation to application of the upper end plug 26 to the upper end 40 of an elongated tube 42 of the fuel rod 18. It should be understood that such description applies equally to the application of the lower end plug 28 to a lower end 44 of the fuel rod tube 42.

Prior Art End Plug Applying Apparatus

As mentioned previously, the fuel rods 18 are hermetically sealed to isolate the fissile material contained therein from the surrounding environment. In order to ensure a reliable seal, it is important that the mechanical connections of the end plugs 26,28 with the opposite ends 40,44 of the elongated tube 42 of the fuel rod 18 be free of defects which could eventually produce leaks.

Figure 2:
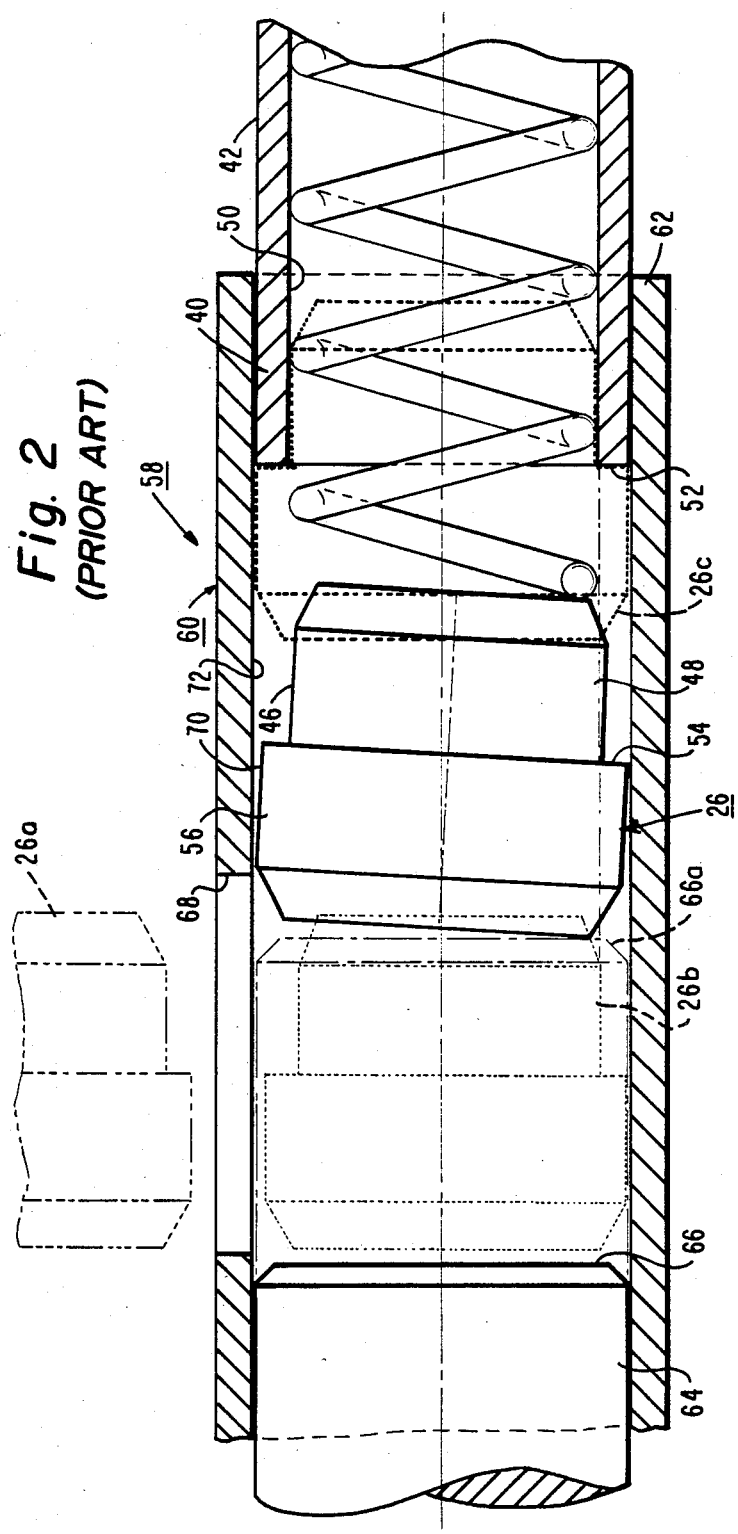
FIG. 2 is a fragmentary sectional view of a prior art apparatus for applying an end plug to an end of a fuel rod tube.

With reference to FIG. 2, the mechanical connection of plug 26 to upper tube end 40 is formed by, first, a close frictional interfitting engagement between an external surface 46 of inner cylindrical portion 48 of the plug 26 and an internal surface 50 of the upper end 40 of the fuel rod tube 42, and, second, a girth weld (not shown) formed at the location of a butt joint of the end edge 52 of the tube upper end 40 and an annular shoulder 54 defined on the end plug 26 by the transition between the inner cylindrical portion 48 and an outer cylindrical portion 56 which has a diameter larger than that of the inner portion 48. The outside diameter of the inner insertable portion 48 of the plug 26 is slightly greater than the inside diameter of the fuel rod tube end 40 for producing a friction fit which expands the tube 42 slightly when the end plug inner portion 48 is inserted into the tube end 40. The outside diameter of the end plug outer portion 56 is such that it is generally equal to the outside diameter of the end 40 of the tube 42 once the latter has been expanded by the inserted inner portion 48 of the end plug.

When one prior art end plug applying apparatus is used, such as shown in FIG. 2 and generally designated by the numeral 58, occasional damage would occur at edge portions of the end plug 26 and/or end 40 of the fuel rod tube 42. As seen in FIG. 2, the prior art apparatus 58 includes an elongated hollow cylindrical guide bushing 60 having inserted into its open end 62 the upper end 40 of the fuel rod tube 42 to which the end plug 26 is to be applied. A cylindrical ram 64, only fragmentarily shown in FIG. 2, is reciprocally moved within the bushing 60 by a conventional source of power (now shown), such as hydraulic or pneumatic pressure, between a retracted position and an extended position.

In the retracted position of the ram 64, as seen in solid line form in FIG. 2, its leading face 66 is located to the left of an upper entrance opening 68 defined in the bushing 60. The opening 68 communicates the interior of the bushing 60 with a magazine (not shown) containing a vertical stack of end plugs 26 (the lower one of which is shown in fragmentary dashed outline form at 26a in FIG. 2). When the ram 64 is in its retracted position, the end plug fed from the magazine enters the opening 68 and is deposited at a loading position (as seen in dotted outline form at 26b in FIG. 2) in front of the leading face 66 of the ram.

The ram 64 is then actuated to move forwardly past the opening 68 and toward the open end 62 of the bushing 60 to its extended position (not shown) in which the end plug is applied to the upper end 40 of the fuel rod tube 42 (as seen in dotted outline form at 26c in FIG. 2). The tube 42 is securely clamped by suitable means (not shown) at the open end 62 of the bushing 60 to withstand axial insertion forces which can exceed 500 pounds. During the forward stroke of the ram 64 (such as exemplified by the position of its leading face, as shown in dashed outline form at 66a in FIG. 2, intermediately of the retracted and extended positions of the ram) in which the end plug is carried ahead of it, occasionally the plug cocks, tips or tumbles (as seen in solid line form at 26 in FIG. 2) so that it does not meet the upper end 40 of the fuel rod tube 42 squarely. This can occur if the plug 26 is at the low end of its tolerance range and the guide bushing 60 is at the high end of its tolerance range. It can also occur if the motion of ram 64 is uneven. In the latter instance, the plug 26 will be propelled forward, losing contact with the leading face 66 of the ram 64. (Continuous contact with the ram face 66 tends to keep the plug 26 aligned with the tube end 40).

Cocking or tipping of the upper end plug 26 (as compared to the lower end plug 28) is worsened by the presence of the plenum spring 30 at the upper end of the tube 42 which tends to resist application of the upper plug 26 to the upper tube end 40. As a consequence, the plug 26 does not seat properly, and oftentimes pieces of the plug 26 or upper tube end 40 are broken off as the inner cylindrical end portion 48 of the plug 26 is forced into the tube 42 (as seen at 26c in FIG. 2). The broken pieces not only damage the end plug 26, but also cause foreign objects to be deposited in the fuel rod 18. While normally the plenum spring 30 is only in the upper end 40 of the fuel rod tubhe 42, the same problems of cocking and tipping occur where there is no spring present at the lower end 44 of the tube 42.

Improved End Plug Applying Apparatus

The apparatus of the present invention, three alternative embodiments of which are disclosed herein, eliminates the problems associated with the abovedescribed prior art apparatus 58 which were caused primarily by the annular clearance between the external surface 70 of the outer portion 56 of the end plug 26 and the internal surface 72 of the guide bushing 60. In each of the alternative embodiments of the improved end plug applying apparatus of the present invention, which will now be described in detail, a guide means is provided having internal surface portions which define an internal guide channel which has a diameter less than the smallest allowable (or tolerable) plug diameter for the outer portion 56 of the end plug 26. Thus the external surface 70 of the plug 26 will always be in guiding contact with the guide channel of the guide means. The guide means is thereby conformable so that it provides intimate contact with the end plug 26 regardless of where the plug falls in its diametral range of tolerance.

Figure 3:
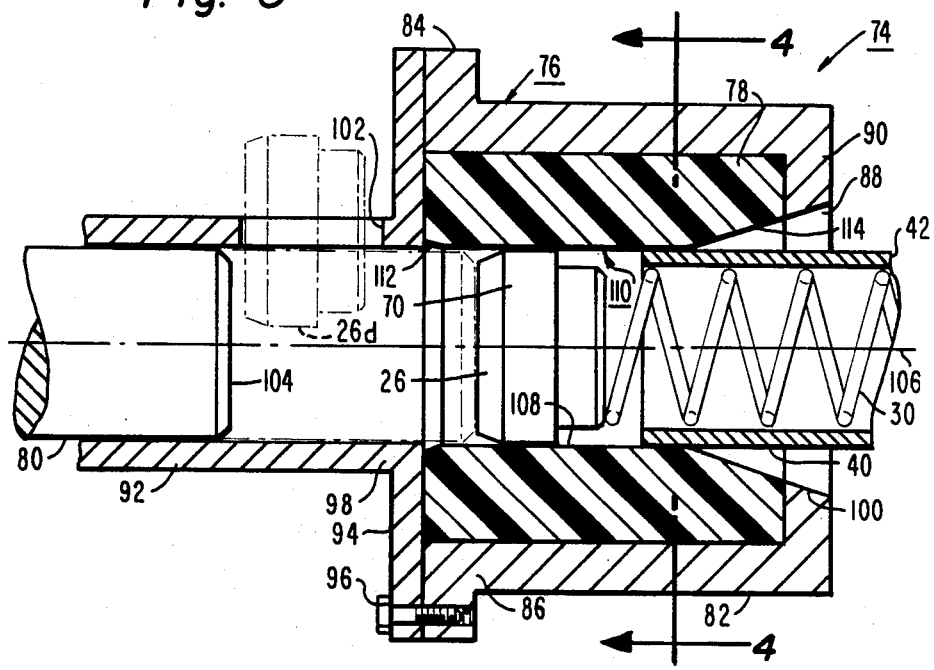
FIG. 3 is a fragmentary sectional view taken along line 3—3 of FIG. 4 of a first alternative embodiment of the apparatus of the present invention for applying an end plug to a fuel rod tube end.
Figure 4:
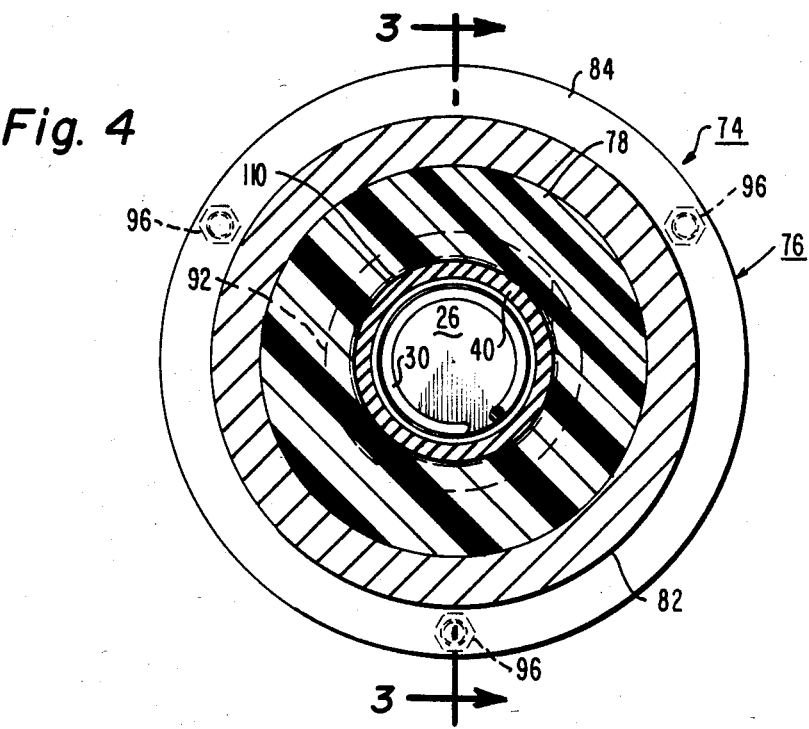
FIG. 4 is a sectional view taken along line 4—4 of FIG. 3.

Turning now to FIGS. 3 and 4, there is shown the first alternative embodiment of the improved end plug applying apparatus of the present invention, being generally indicated by the numeral 74. The end plug applying apparatus 74 basically includes a housing 76, guide means in the form of a resiliently deformable bushing 78, and plug moving means such as a cylindrical ram 80.

The housing 76 is in the form of a cylindrical cup 82 having an outwardly-turned annular flange 84 encompassing its mouth end 86 and an opening 88 formed in its opposite bottom end 90. The housing 76 also includes a cylinder 92 within which the ram 80 is reciprocally moved by any suitable source of power, such as hydraulic or pneumatic pressure as mentioned above. Specifically, the cylinder 92 has an end flange 94 against which the mouth end 86 of the housing cup 82 is placed and to which the cup is attached by a series of bolts 96 used to securely fasten the cup flange 84 to the periphery of the cylinder flange 94.

The housing 76 has spaced inlet and outlet ends 98,100 adapted to receive the end plug 26 and tube end 40, respectively. The inlet end 98 of the housing 76 is defined by the open end of the cylinder 92 surrounded by the end flange 94. The cylinder 92 also has an upper opening 102 immediately behind the end flange 94 through which the end plug (as seen in dashed outline form at 26d in FIG. 3) is deposited by a feed magazine (not shown) into a loading position in front of the leading face 104 of the ram 80. The outlet end 100 of the housing 76 is defined by the opening 88 formed in the bottom end 90 of the housing cup 82.

The resiliently-deformable bushing 78 forming the guide means of the first alternative embodiment of the improved apparatus 74 is disposed in the housing 76 and aligned in tandem with the inlet and outlet ends 98,100 of the housing along a common axis 106. The bushing 78 has a continuous internal side wall 108 defining a central bore 110 in coaxial alignment with the housing inlet and outlet ends 98,100. The internal side wall 108 defines the guide channel of the guide means and has a cross-sectional size, i.e. diameter, smaller than that of the outer external surface 70 of the outer portion 56 of the end plug 26.

The bushing 78, due to being composed of resiliently deformable material, such as urethane, is adapted to expand and conform to the outer external surface 70 of the end plug 26 upon conrtact therewith. Thus, when the ram 80 is moved along the common axis 106, its leading face 104 engages and moves the end plug 26 from the inlet end 98 of the housing 76 through the guide channel defined by central bore 110 to the outlet end 100 of the housing. The movement of the end plug 26 through the central bore 110 causes yieldable expansion of the cross-sectional size of the bore such that the internal side wall 108 (which includes the surface portions defining the guide channel) conforms to the external surface 70 of the end plug 26 and thereby establishes and maintains guiding contact therewith as the end plug is moved through the bore 110 of the bushing 78.

In one exemplary form of the first alternative embodiment of the improved apparatus 74, the housing cup 82 is bored out to form a portion of a mold for casting the guide bushing 78 in place. The housing 76 plus two core pieces (not shown) comprise the mold. The mold core pieces are sized about 0.001" below the minimum plug major diameter. The amount of interference thus varies from 0.001" to 0.003". The mold core pieces are ground and polished. This results in an exceptionally smooth bore 110 in the cast urethane bushing 78. The long wearing characteristic of the urethane material should result in a long service life for the bushing 78. Also, the bushing 78 is cast with a tapered entrance and exit sections 112, 114. A step can be added to act as a guide for tube end 40 if desired.

Figure 5:
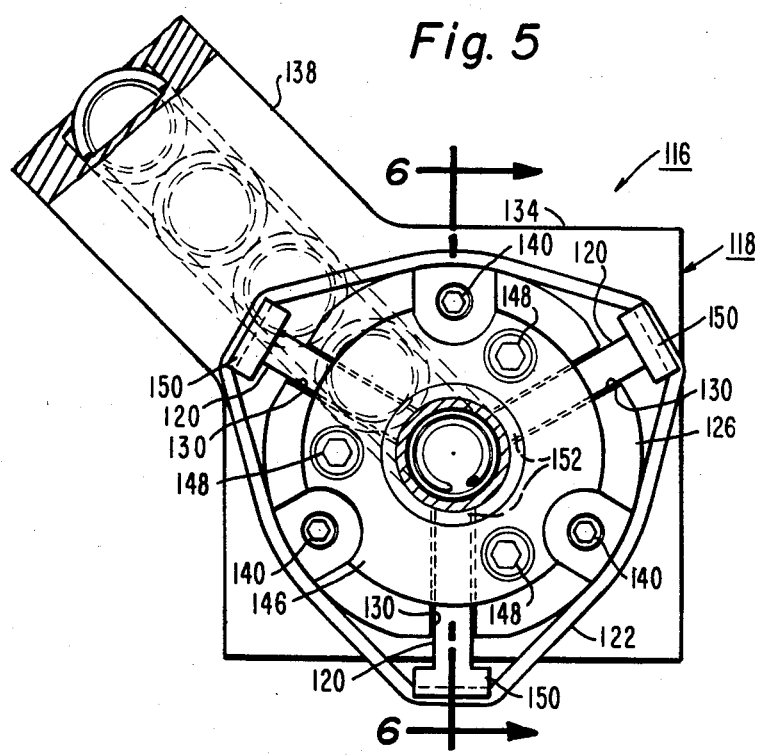
FIG. 5 is an end view, partly in section, taken along line 5—5 of FIG. 6 of a second alternative embodiment of the end plug applying apparatus of the present invention.
Figure 6:
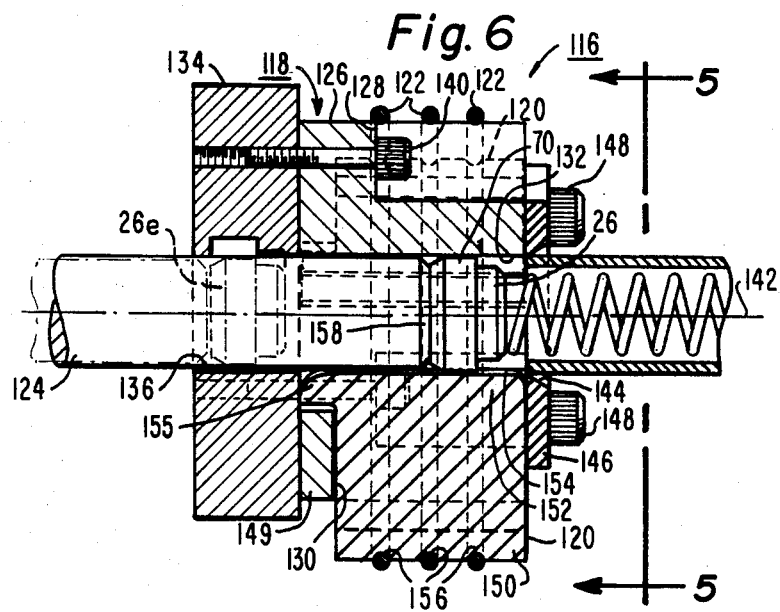
FIG. 6 is a sectional view taken along line 6—6 of FIG. 5.

Referring now to FIGS. 5 and 6, there is shown the second alternative embodiment of the improved end plug applying apparatus of the present invention, being generally indicated by the numeral 116. The end plug applying apparatus 116 basically includes a housing 118, guide means in the form of a plurality of runners 120 and resiliently expandable members 122, and end plug moving means such as a cylindrical ram 124.

The housing 118 is in the form of a cylindrical fixture 126 having respectively defined therein a series of peripheral recesses 128, a series of elongated passageways 130, and a central hole 132. The housing 118 also includes a base 134 having a central opening 136 and to which is integrally connected the feed chute 138 of a magazine for supplying end plugs 26 to the central opening 136 in the housing base. The fixture 128 and base 134 of the housing 118 are attached together by a series of bolts 140 located within the recesses 128 which securely fasten the fixture 128 to spaced locations on the base 134 so as to align their respective central hole 132 and opening 136 along a common axis 142.

The housing 118 has spaced inlet and outlet ends adapted to receive the end plug 26 and the tube end 40, respectively. The inlet end of the housing 118 is defined by the central opening 136 of the base 134, while the outlet end is defined by a central tapered hole 144 of circular plate 146 attached to the fixture 126 by a series of bolts 148 on a side opposite from the base 134. The radial passageways 130 within the fixture 126 are defined between the plate 146 and a circular wall portion 149 of the fixture which lies flush against the base 134. Furthermore, the passageways 130 are spaced from one another about the common axis 142 and the elongated axis of the passages 130 extend generally radially from the axis 142.

Each of the plurality of runners 120 of the improved apparatus 116 is mounted in one of the passageways 130 in the housing 118 such that the runners 120 are maintained spaced apart from one another about the axis 142, the elongated axis of the runners 120 extend generally radially from the axis 142, and are move radially toward and away from the axis. The runners 120 have outer portions 150 extending outwardly from the passageways 130 and inner portions 152 extending inwardly from the passageways. The inner runner portions define longitudinally extending inner surfaces 154 exposed to and facing one another so as to define the guide channel for the end plug 26 therebetween. In an exemplary form, the runners 120 can be fabricated from hardened, chrome-plated and polished material with tapered lead-ins on opposite edges of their inner portions 152. Also, the edge 155 on each runner 120 adjacent the base 134 is caged by the circular wall portion 149 of the fixture 126 so as to limit radial movement of the runner 120 within the passageway 130 away from the axis 142.

Circumscribing the housing 118, and stretched about the outer runner portions 150 in arcuate depressions 156 therein is the plurality of resilient expandable members 122, which can take any suitable form, such as garter springs or elastomer bands, for instance. The members 122 bias the runners 120 inwardly toward one another so as to maintain the cross-sectional size of the guide channel formed between the inner surfaces 154 on runner inner portions 152 less than the cross-sectional size of the outer portion 56 of the end plug 26. The material of the members 122 is stretchable and, thus, when the ram 124 is moved along the common axis 142 and its leading face 158 engages and moves the end plug from its initial position (as seen in dashed outline form at 26e in FIG. 6) into the guide channel, the members 122 yieldably allow movement of the runners 120 away from one another upon contact of the inner surfaces 154 thereof with the outer external surface 70 of the end plug 26. In such manner, the runner inner surfaces 154 defining the guide channel conform to the external surface 70 of the end plug 26 and thereby establish and maintain guiding contact therewith as the end plug is moved from the inlet to the outlet ends of the housing 118 to where the end plug is applied to the tube end 40.

Figure 7:
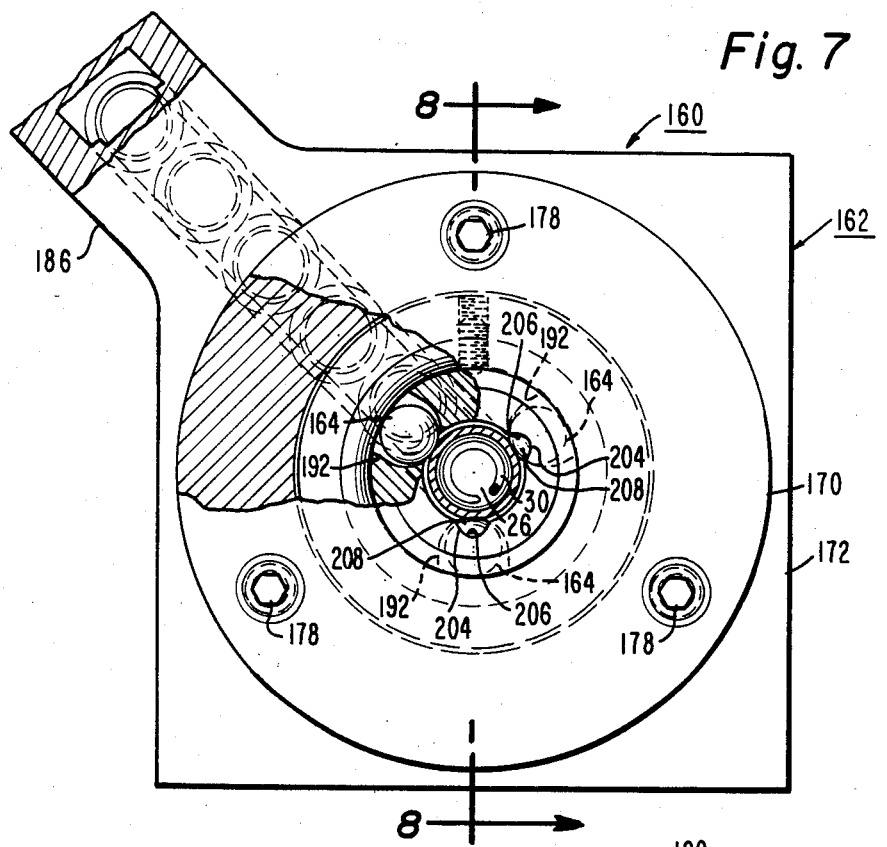
FIG. 7 is an end view, partly in section, taken along line 7—7 of FIG. 8 of a third alternative embodiment of the end plug applying apparatus of the present invention.
Figure 8:
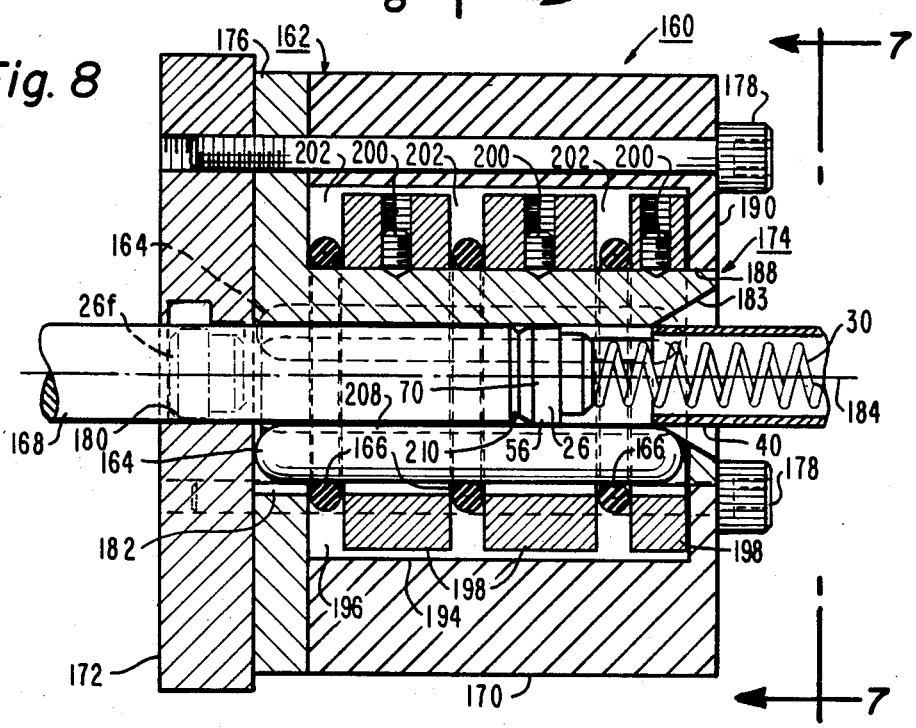
FIG. 8 is a sectional view taken along line 8—8 of FIG. 7.

Turning finally to FIGS. 7 and 8, there is shown the third alternative embodiment of the improved end plug applying apparatus of the present invention, being generally indicated by the numeral 160. The end plug applying apparatus 160 basically includes a housing 162, guide means in the form of a plurality of rolls 164 and resiliently expandable elements 166, and plug moving means such as a cylindrical ram 168.

The housing 162 is in the form of a cup-shaped cap 170, a base 172, and a hub assembly 174 disposed within the cap 170 and having an end flange 176 interposed between the cap 170 and base 172 with a series of bolts 178 securely fastening the cap 170, base 172 and hub flange 176 together. The base 172 has a central opening 180 which is aligned with a center bore 182 in a hub 183 of the hub assembly 174 along a common axis 184. A feed chute 186 of a magazine for supplying end plugs 26 to the central opening 180 in the base 172 is integrally connected thereto.

The housing 162 has spaced inlet and outlet ends adapted to receive the end plug 26 and the tube end 40, respectively. The inlet end of the housing 162 is defined by the central opening 180 of the base 172, while the outlet end is defined by a central hole 188 in the outer end 190 of the cap 170. The hub 183 is aligned with and extends into the central hole 188 of the cap 170. A series of elongated recesses 192 are defined in the hub 183, spaced from one another about the common axis 184 and aligned generally parallel to one another and with the axis 184.

Furthermore, the hub 183 is spaced radially inwardly from a continuous cylindrical wall 194 of the cap 170 which provides an annular space 196 therebetween. The hub assembly 174 includes a series of annular rings 198 disposed about and spaced along the hub 183 and fixed thereto by set screws 200 so as to define a series of circumferential slots 202 spaced from one another along the common axis 184 and intersecting the elongated recesses 192.

Each of the plurality of elongated generally cylindrical rolls 164 of the improved apparatus 160 is mounted in one of the recesses 192 in the hub 183 such that the rolls are maintained spaced apart from one another about the common axis 184, disposed generally parallel thereto and to one another, and are movable radially toward and away from the axis. Each recess 192 has an inner end 204 defining an elongated opening 206 of a width less than that of the roll 164 such that the rolls have longitudinally-extending surface portions 208 exposed to and facing toward one another through the openings 206 so as to define the guide channel for the end plug 26 therebetween. In an exemplary form, the rolls 164 can be fabricated from hardened, chrome-plated and polished material with tapered lead-ins on opposite ends thereof. Also, the rolls 164 are caged by the portions of the annular rings 198 which overlie the recesses 192 so as to limit radial movement of the rolls within the recesses away from the axis 184.

Circumscribing the housing 162 within the respective circumferential slots 202 formed by the annular rings 198, and stretch about the rolls 164, is the plurality of resilient expandable elements 166, which can take any suitable form, such as garter springs or elastomer bands, for example. The elements 166 bias the rolls 164 inwardly toward one another and toward the inner ends 204 of the recesses 192 so as to maintain the cross-sectional size of the guide channel formed between the inner surface portions 208 of the rolls less than the cross-sectional size of the outer portion 56 of the end plug 26. Due to the material of the elements 166 and, thus, when the ram 168 is moved along the common axis 184 and its leading face 210 engages and moves the end plug from its initial position (as seen in dashed outline form at 26f in FIG. 8) into the guide channel, the elements 166 yieldably allow deflection or movement of the rolls 164 away from one another upon contact of the inner surface portions 208 with the outer external surface 70 of the end plug 26. In such manner, the roll inner surface portions 208 defining th guide channel conform to the external surface 70 of the end plug 26 and thereby establish and maintain guiding contact therewith as the end plug is moved from the inlet to the outlet ends of the housing 162 to where the end plug is applied to the tube end 40.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the forms hereinbefore described being merely a preferred or exemplary embodiments thereof.

We claim:

1. An end plug applying apparatus for applying an end plug to a hollow tube end of a nuclear fuel rod such that a frictional interfitting engagement will be established between the end plug and the tube end facilitating the formation of a connection therebetween which hermetically seals the fuel rod, said apparatus comprising:
   (a) a housing having spaced inlet and outlet ends, said inlet end adapted to receive the end plug and said outlet end adapted to receive the tube end to which the plug is to be applied;
   (b) guide means disposed in said housing and having internal surface portions which define an internal guide channel aligned in tandem with said inlet and outlet ends of said housing along a common axis and being of a cross-sectional size smaller than that of an outer external surface of the end plug, said guide means being yieldably expandable radially with respect to said common axis;
   (c) means defining an infeed opening adjacent said inlet end of said housing and displaced laterally of said common axis through which the end plug is fed in a direction extending toward said common axis to a loading position in front of said inlet end of said housing; and
   (d) means disposed adjacent said inlet end of said housing and movable along said common axis for engaging and moving the end plug from said loading position in front of said inlet end, through said inlet end and through said guide channel, to said outlet end, said movement of said plug through said guide channel causing yieldable expansion of the cross-sectional size of said guide means such that said surface portions of said guide means conform to the outer external surface of the end plug and maintain guiding contact therewith as the end plug is moved through said guide channel;
   (e) said housing has a series of elongated guideways spaced from one another about said common axis, and the elongated axis of each guideway extending generally radially from said common axis;
   (f) said guide means includes
      a plurality of elongated guide members mounted in said respective guideways for radial movement relative to said common axis and having inner portions facing toward one another so as to define said guide channel therebetween and the elongated axis of each guide member extending generally radially from said common axis, and
      a plurality of flexible resilient expandable endless members surrounding said plurality of guide members so as to bias said guide members toward one another, said endless members yieldably allowing movement of said guide members away from one another upon contact of said inner portions thereof with the end plug for establishing and maintaining guiding contact with the end plug as the same is moved through said guide channel.

2. End plug applying apparatus as recited in claim 6, wherein:
   said also extend generally parallel to and radially from said common axis;
   said guide members have outer portions extending outwardly from said guideways; and
   said endless members are stretched about said outer portions of said guide members.

3. End plug applying apparatus as recited in claim 1, wherein:

said also extend generally parallel to one another and with said common axis;

said guide members are disposed generally parallel to one another and to said common axis; and said endless members are axially spaced apart and stretched about said guide members.

4. Improved apparatus for applying an end plug to a hollow tube end of a nuclear fuel rod such that a frictional interfitting engagement will be established between the end plug and the tube end facilitating the formation of a connection therebetween which hermetically seals the fuel rod, said apparatus comprising:

(a) a housing having spaced inlet and outlet ends, said inlet end adapted to receive the end plug and said outlet end adapted to receive the tube end to which the plug is to be applied;

(b) guide means disposed in said housing and having internal surface portions which define an internal guide channel aligned in tandem with said inlet and outlet ends of said housing along a common axis and being of a cross-sectional size smaller than that of an outer external surface of the end plug, said guide means being yieldably expandable radially with respect to said common axis;

(c) means defining an infeed opening adjacent said inlet end of said housing and displaced laterally of said common axis through which the end plug is fed in a direction extending toward said common axis to a loading position in front of said inlet end of said housing; and (d) means disposed adjacent said inlet end of said housing and movable along said common axis for engaging and moving the end plug from said loading position in front of said inlet end, through said inlet end and through said guide channel, to said outlet end, said movement of said plug through said guide channel causing yieldable expansion of the cross-sectional size of said guide means such that said surface portions of said guide means conform to the outer external surface of the end plug and maintain guiding contact therewith as the end plug is moved through said guide channel;

(e) said housing has a series of elongated passageways spaced from one another about said common axis and the elongated axis of each passageway extending generally radially from said common axis;

(f) said guide means includes a plurality of elongated runners, each runner being mounted in one of said passageways in said housing such that said runners are maintained spaced apart from one another about said common axis, the elongated axis of each runner extending generally radially from said common axis and are movable radially toward and away from said common axis, said runners having outer portions extending outwardly from said passageways and inner portions extending inwardly from said passageways which define longitudinally-extending inner surfaces exposed and facing toward one another so as to define said guide channel therebetween, and a plurality of resiliently expandable members circumscribing said housing and stretched about said outer portions of said runners so as to bias said runners inwardly toward one another, said members yieldably allowing movement of said runner within said passageways away from one another upon contact of said inner surfaces thereof with the outer external surface of the end plug for establishing and maintaining guiding contact with the end plug as the same is moved through the guide channel between the inlet and outlet ends.

5. Improved end plug applying apparatus as recited in claim 4, wherein said expandable members take the form of a series of endless bands.

* * * * *